US012764254B1

(12) United States Patent
Lutter

(10) Patent No.: US 12,764,254 B1
(45) Date of Patent: Oct. 13, 2026

(54) MALICIOUS ACTOR DETECTION FOR A VIRTUAL CONFERENCE SERVICE

(71) Applicant: Zoom Video Communications, Inc., San Jose, CA (US)

(72) Inventor: Jan Lutter, Ahlen (DE)

(73) Assignee: Zoom Communications, Inc., San Jose, CA (US)

( * ) Notice: Subject to any disclaimer, the term of this patent is extended or adjusted under 35 U.S.C. 154(b) by 155 days.

(21) Appl. No.: 18/425,227

(22) Filed: Jan. 29, 2024

(51) Int. Cl.
*H04N 7/15* (2006.01)
*H04N 7/14* (2006.01)

(52) U.S. Cl.
CPC ............ *H04N 7/152* (2013.01); *H04N 7/147* (2013.01); *H04N 7/157* (2013.01)

(58) Field of Classification Search
CPC .............................. H04N 7/152; H04N 7/147
See application file for complete search history.

(56) References Cited

U.S. PATENT DOCUMENTS

2013/0017780 A1* 1/2013 Rose ...................... H04M 3/56 455/41.1
2022/0116231 A1* 4/2022 Choi ................. G06Q 10/0832

* cited by examiner

*Primary Examiner* — Amal S Zenati
(74) *Attorney, Agent, or Firm* — Kilpatrick Townsend & Stockton LLP

(57) ABSTRACT

In some implementations, techniques may include joining a virtual conference hosted by a virtual conference provider with one or more conference participants. In addition, the techniques may include accessing conference information corresponding to the virtual conference and participant information corresponding to each of the one or more conference participants. The techniques may include providing the conference information and the participant information as input to a machine learning model that is trained to assign a confidence score to each of the one or more conference participants. Moreover, the techniques may include receiving one or more confidence scores as output from the machine learning model. Each confidence score can correspond to a conference participant. Also, the techniques may include determining, for at least one of the one or more conference participants, whether to perform a corrective action on a respective conference participant based on the one or more confidence scores.

20 Claims, 8 Drawing Sheets

MALICIOUS ACTOR DETECTION FOR A VIRTUAL CONFERENCE SERVICE

FIELD

This disclosure generally relates to virtual conferencing, and more specifically relates to malicious actor detection for a virtual conference service.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
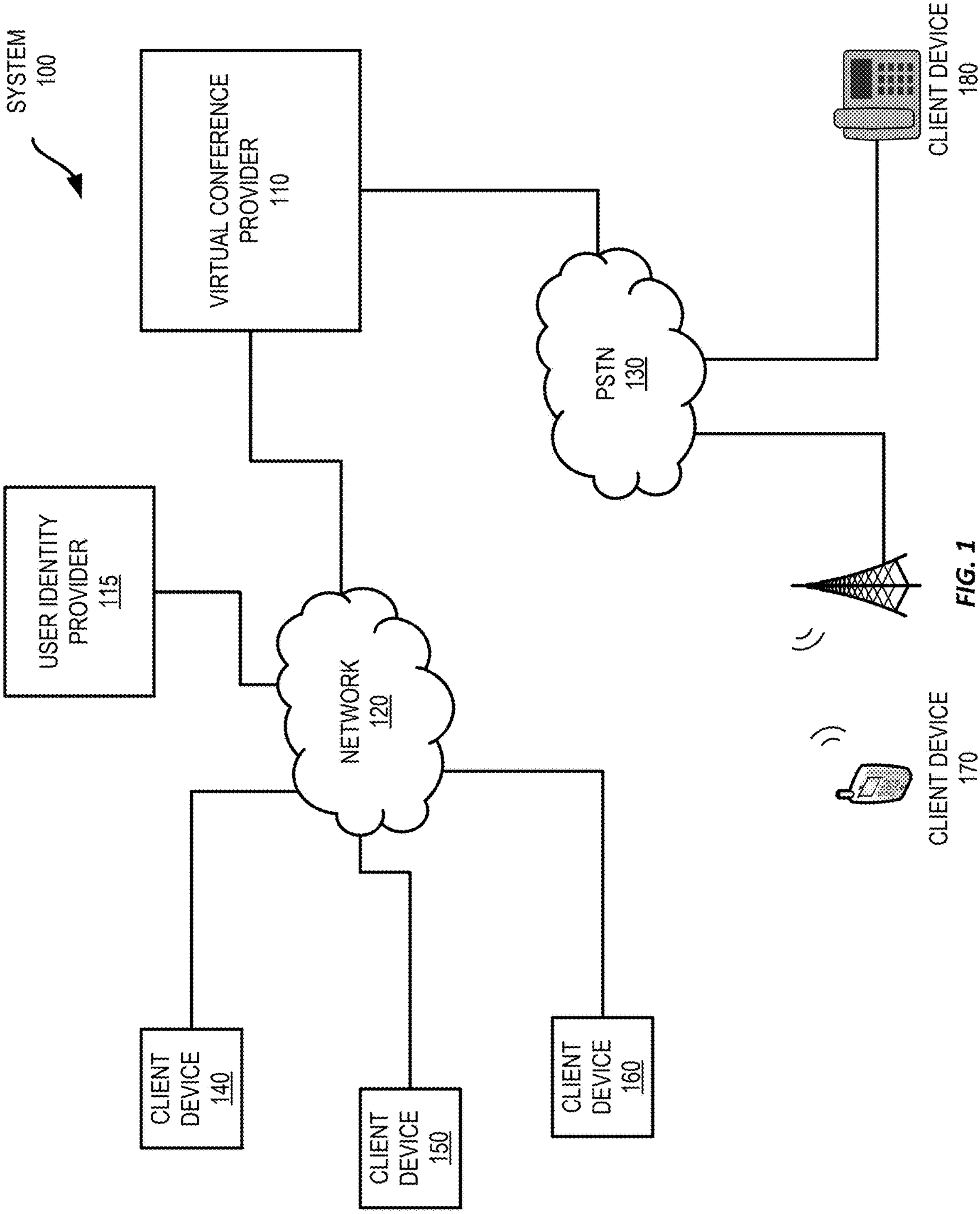
FIGS. 1-3 show example systems for malicious actor detection for a virtual conference provider.

Examples are described herein in the context of malicious actor detection for a virtual conference provider. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Before, during, or after a virtual conference, participants may engage with each other to discuss any matters of interest. For example, virtual conferences can be used socially to engage with friends and family, educationally to attend a class, or to conduct business. Unfortunately, the increasing importance of virtual conferences have facilitated their use for deception or fraud. For example, a filter or machine learning model, or even a recording of a previous conference, can be used by a bad actor to misrepresent their appearance or voice during a virtual conference.

The risk of fraud can be more pronounced during a virtual conference when compared to a phone call or other audio communication, because the technology to falsify video streams is new and unfamiliar to potential victims. For example, an elderly user may not know to be suspicious about a faked video stream of their grandchild because the user is not aware that the stream can be altered. In contrast, the same user may be suspicious of an audio stream because they familiar with techniques to alter voices such as an individual faking an accent. Therefore, potential victims may be more vigilant with audio streams because they are more familiar with techniques to fake audio than they are with machine learning models that can alter a person's appearance.

In addition, it may be easier for users to verify the authenticity of an audio stream than a video conference. In contrast to a phone call, participants in a virtual conference are less equipped to verify a virtual conference's source. For example, phone calls may use a consistent phone number to establish an audio call between participants. In contrast, attendees generally access a virtual conference via a weblink that is unique to each conference (e.g., a uniform resource locator (URL) generated for the conference). This link may be sent directly from a virtual conference provider and a participant may be unable to easily distinguish between an authentic weblink and a fabricated link. For example, a link sent from a trusted party and a fraudulent link purporting to be from the trusted party could both be sent from the conference provider. In contrast, a user may be suspicious of a phone call from an unknown number because the user can recognize the source as potentially untrustworthy by cross referencing the phone number against other sources. For example, a family member's phone number may be saved in contacts or a phone number from a purported work contact can be checked against their business card or website.

Also, it can be easier for a bad actor to deceptively join a virtual conference. For example, a bad actor may try to join a company's quarterly earnings call to illicitly gain insider information. Unlike a phone call, which generally includes a few participants, virtual conferences regularly include tens, hundreds, or even thousands of participants. Verifying the authenticity of each participant can be difficult or impossible to achieve within a typical meeting (e.g., 30 minutes to 1 hour). In addition, it is unclear how authenticity could be reliably verified. Even if the conference host is personally familiar with each participant, currently available models could be used to mask a participant's voice and likeness.

This authentication problem is further complicated because virtual conference providers often provide flexible means to join a conference. A participant may be permitted to join a conference using a virtual conference client software on a laptop computer, client software on a mobile device, or by calling in to the provider's network with a telephony device. Such flexibility may be needed to ensure access to a conference in variable network conditions. In many instances, a device accessing a conference may not be associated with an account of the virtual conference provider, and, accordingly, it can be challenging to distinguish between authentic and fraudulent conference attendees.

To authenticate participants, machine learning techniques can be used to flag potentially suspicious virtual conference behavior. These machine learning techniques can include a model that has been trained to classify a conference participant as trustworthy or untrustworthy (e.g., a security model). Characteristics for each conference participant, and characteristics of the virtual conference, can be input to the security model. Using these input features, the machine learning model can output a probability that a conference participant is untrustworthy. The participant corresponding to the output probability can be flagged as untrustworthy if the probability is above a threshold.

The features input to the security model can include any characteristics that may be indicative of a security threat. For example, the features for each conference participant may include the account age, the type of client device hosting the virtual conference client software, and the geographic location of the client device. In this example, a participant with a newly created account that is accessing the virtual conference from an unusual geographic location, e.g., with respect to other participants in the virtual conference, may be potentially a bad actor. For example, a participant accessing the virtual conference from Canada may be potentially suspicious if all of the other participants are in Poland.

The features for a conference participant may also include the participant's past behavior. For example, a conference participant with too many changed characteristics (e.g., changed geographic location and device type) may be potentially untrustworthy. Continuing the example, a conference participant that has historically used client software executing on a smartphone in Austin, Texas may be flagged as suspicious if the participant's account attempts to access a virtual conference from a laptop in Delaware.

Output from other machine learning models can be used as input features to evaluate a conference participant's trustworthiness. For example, a model that is trained to detect altered video streams can be used to determine a probability that a video stream has been altered. In addition, a model can be used to detect altered speech in an audio stream. Video streams and/or audio streams for each conference participant can be input to these stream models, and a probability that a feed has been altered can be output from each stream model. The probabilities output from the video stream model and/or an audio stream model can be used by the security model, along with other features for each conference participant, to classify participants' trustworthiness.

In some embodiments, natural language processing (NLP) techniques can be used to identify suspicious behavior from conference participants. For example, criminal organizations may engage in social engineering schemes where a target is manipulated to take particular actions that benefit the criminal organization. For example, someone may fake a romantic relationship or impersonate a family member in order to induce a target to transfer money. Often these schemes follow set scripts and language used to trick a first target may be repeated with a second target. To detect this fraud, an NLP model may be trained on scripts sourced from the internet or criminal investigations. After training, the model parameters can be frozen and the model can be used to detect social engineering schemes without further training (e.g., the model will not learn any new information from customer).

The techniques disclosed herein provide a number of technical advantages over existing techniques. For example, the proposed security model allows for real-time analysis of the trustworthiness of tens, hundreds, or thousands of conference participants that could not practically be achieved in the human mind. In addition, the techniques include automated corrective actions that provide a specific improvement over existing virtual conference user interfaces because the corrective actions, including changing the relative position of participants, are automatically taken based on a probability that each conference participant is untrustworthy.

This illustrative example is given to introduce the reader to the general subject matter discussed herein and the disclosure is not limited to this example. The following sections describe various additional non-limiting examples and examples of providing edited virtual conference recordings.

Referring now to FIG. 1, FIG. 1 shows an example system 100 that provides virtual conferencing functionality to various client devices. This virtual conferencing functionality can include the exchange of audio and video streams during a virtual conference, and the exchange of chat messages before, during, and after a virtual conference. These chat messages can be persistent messages that exist for an indefinite time or temporary messages that persist for a set period of time or until an event has occurred (e.g., until the conclusion of a meeting). The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide virtual conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the virtual conference provider 110. In this example, the user identity provider 115 is operated by a different entity than the virtual conference provider 110, though in some examples, they may be the same entity. In some instances, virtual conference provider 110 may provide a user profile language to virtual conference provider 210.

Figure 2:
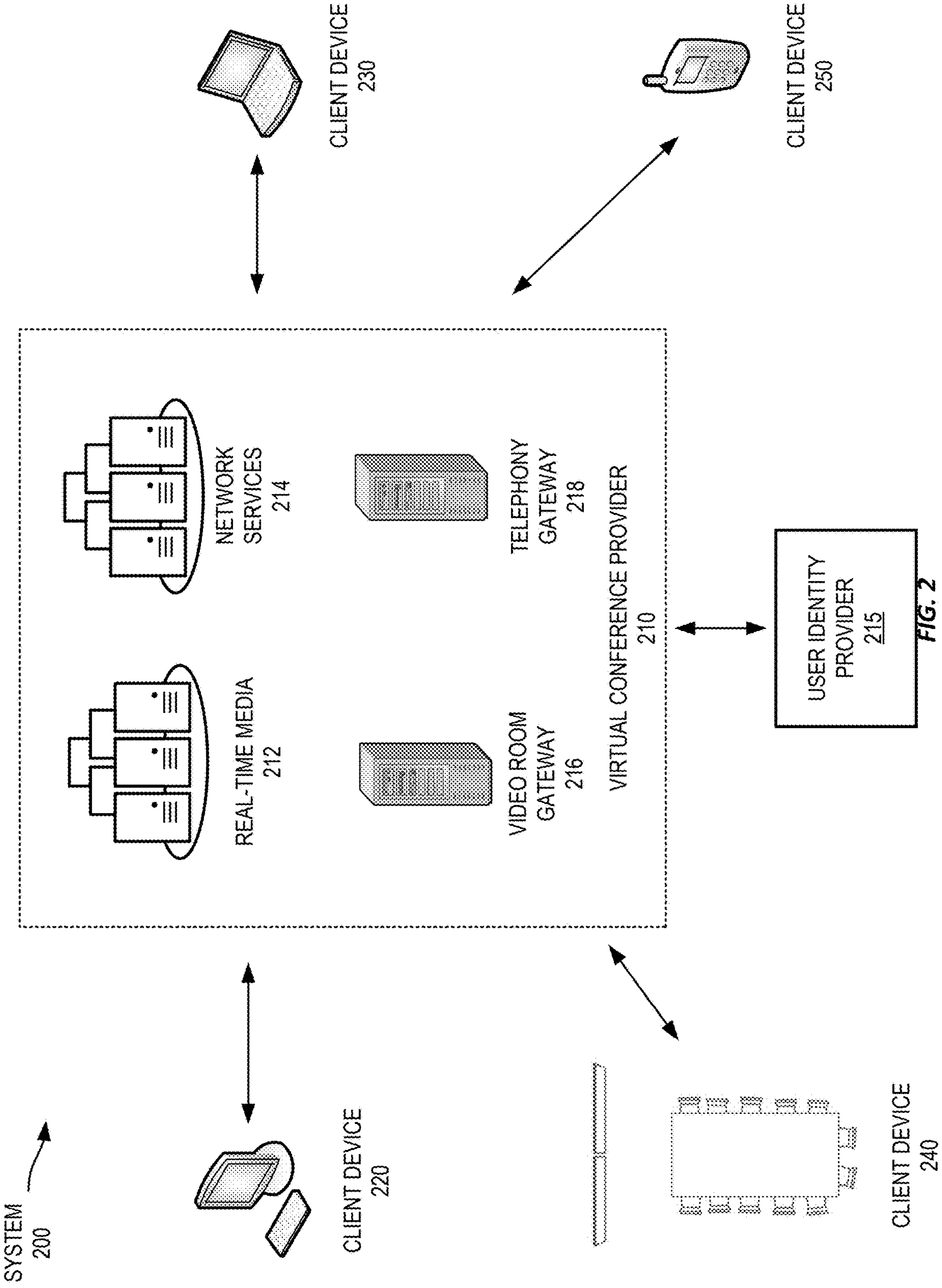

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging (e.g., chat messaging) before, during, or after the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference (e.g., virtual conference) may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the virtual conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, a meeting language, etc. After receiving the various meeting settings, the virtual conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the virtual conference provider 110. They also receive audio or video information from the virtual conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 4G, etc.), or any combination of these. Other types of computing devices may be used instead or as well, such as tablets, smartphones, and dedicated video conferencing equipment. Each of these devices may provide both audio, video, and messaging capabilities and may enable one or more users to participate in a virtual conference meeting hosted by the virtual conference provider 110.

Client devices 140-180 can be used to send chat messages to the virtual conference provider 110 and to view messages within the provider's system. These chat messages can be sent and viewed through a webpage accessed by a client device 140-160 or client application executed by a client device 140-160. In some cases, the chat messages can be sent by a telephony device using a text messaging protocol/service such as the short messaging service (SMS). The client devices 140-170 may need to be authenticated before chat messages can be sent or viewed.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively. The user identify provider 115 may provide a user profile language to the virtual conference provider 110.

For telephony devices, e.g., client devices 170-180, the user may place a telephone call to the virtual conference provider 110 to access virtual conference services. After the call is answered, the user may provide information regarding a virtual conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the virtual conference provider 110. In some embodiments, a device may need to be authenticated in order to send chat messages to the virtual conference provider system or to view chat messages sent within the system.

Referring again to virtual conference provider 110, in some examples, it may allow client devices 140-160 to encrypt their respective video and audio streams, and chat messages, to help improve privacy in their meetings. Encryption may be provided between the client devices 140-160 and the virtual conference provider 110 or it may be provided in an end-to-end configuration where media streams, and chat messages, transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted media streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt media content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt media streams. Thus, while encrypting the media streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides virtual conferencing functionality to various client devices 220-250. The client devices 220-250 include two conventional computing devices 220-230, dedicated equipment for a virtual conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of virtual conference functionality, thereby enabling the various client devices to create and participate in virtual conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more virtual conference meetings to the client devices 220-250. Each of these servers 212-218 can use the one or more communication networks to facilitate the exchange of chat messages between the client devices 220-250.

The real-time media servers 212 provide multiplexed media streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing. In some instances, the media stream may contain metadata indicating a language for the media stream or the client devices 220-250. The language may be a device language provided by software on the client device or a language selected by a user of the client device via a graphical user interface (GUI).

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives media streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service. Chat messages originating from each client device 220-250 can be presented to each client device including the device that generated the message. The messages from each client device 220-250 can be presented to a client device in a graphical user interface of client software executing on the client device or a webpage accessed by the client device. The graphical user interface may label each message with an account or device that generated the message and a time stamp corresponding to a time when the message was generated. Client devices 220-250 do not need to be participating in a virtual conference in order to exchange chat messages, and chat messages can be exchanged by client devices, or user accounts, that have never attended the same conference and are not scheduled to attend the same virtual conference. In some situations, a participant can attend a virtual conference using a first client device and simultaneously access chat messages through a second client device. The virtual conference provider 210 can organize the chat messages into channels and these channels can be provided to one or more of the client devices 220-250.

In addition to multiplexing media streams, the real-time media servers 212 may also decrypt incoming media stream in some examples. As discussed above, media streams may be encrypted between the client devices 220-250 and the virtual conference system 210. In some such examples, the real-time media servers 212 may decrypt incoming media streams, multiplex the media streams appropriately for the various clients, and encrypt the multiplexed streams for transmission.

In some examples, to provide multiplexed streams, the virtual conference provider 210 may receive media streams from the various participants and publish those streams to the various participants to subscribe to and receive. Thus, the virtual conference provider 210 notifies a client device, e.g., client device 220, about various media streams available from the other client devices 230-250, and the client device 220 can select which media stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted media streams at a user's request. For example, the meeting host may be able to request that the meeting be recorded or that a transcript of the audio streams be prepared, which may then be performed by the real-time media servers 212 using the decrypted media streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted media streams at the virtual conference provider, such as monitoring video or audio quality, adjusting or changing media encoding mechanisms, etc.

It should be appreciated that multiple real-time media servers 212 may be involved in communicating data for a single meeting and media streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive media streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing media streams, and chat messages, may be distributed throughout the virtual conference system 210 and across many different real-time media servers 212.

Turning to the network services servers 214, these servers 214 provide administrative functionality to enable client devices to create or participate in meetings, send meeting invitations, create or manage chat channels, create or manage user accounts or subscriptions, and other related functionality. Further, these servers may be configured to perform different functionalities or to operate at different levels of a hierarchy, e.g., for specific regions or localities, to manage portions of the virtual conference provider under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider allows for anonymous users. For example, an anonymous user may access the virtual conference provider using client 220 and provide a meeting ID and passcode. The network services server 214 may use the meeting ID to identify an upcoming or on-going meeting and verify the passcode is correct for the meeting ID. After doing so, the network services server (s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, a meeting language, a source language or a target language for translation, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving media streams. In some instances, the real-time media servers 212 may store a source language, target language, user profile language, meeting language, or identified language for the media streams sent and received by the server.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle media streams, and chat messages, to and from the requesting client device 220-250 and provides information to the client device 220-250 to connect to the identified real-time media server 212. In some embodiments, the separate servers may be used to handle media streams and chat messages. Additional client devices 220-250 may be added to the meeting as they request access through the network services server(s) 214.

After joining a meeting, client devices will send and receive media streams, and chat messages, via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the virtual conference provider to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3:
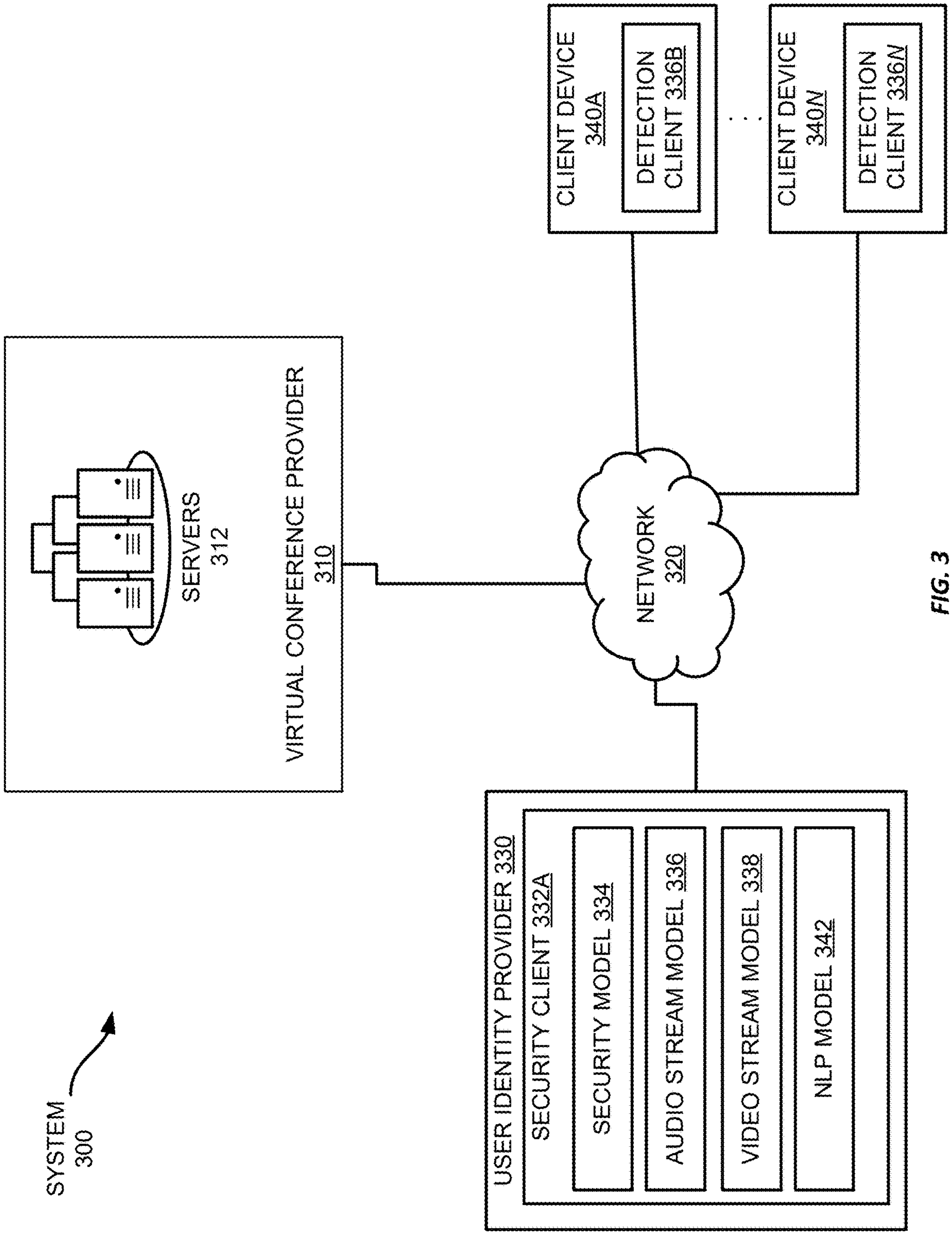

Referring now to FIG. 3, FIG. 3 shows an example system 300 for implementing malicious actor detection for virtual conferences. The system 300 includes a virtual conference provider 310, which can be connected to multiple client devices 340*a*-*n* via one or more intervening communication networks 320. In this example, the communications network 320 is the internet, however, any suitable communications network or combination of communications network may be employed, including LANs (e.g., within a corporate private LAN), WANs, etc.

Each client device 340*a*-*n* executes virtual conference software, which connects to the virtual conference provider 310 and joins a meeting. During the meeting, the various participants (using virtual conference software or "client software" at their respective client devices 340*a*-*n*) are able to interact with each other to conduct the meeting, such as by viewing video feeds and hearing audio feeds from other participants, and by capturing and transmitting video and audio of themselves (e.g., media streams).

Client devices 340*a*-*n* may join virtual conferences hosted by the virtual conference provider 310 by connecting to the virtual conferences provider and joining a desired virtual conference, generally as discussed above with respect to FIGS. 1-2. Once the participants have joined the conference, they may interact with each other in real time by exchanging audio and video feeds (e.g., media streams).

One or more of the client devices 340*a*-*n* may need to be authenticated before joining a virtual conference. The authentication can be performed by a user identify provider 330 with the techniques described in reference to user identify provider 215. To authenticate each client device 340*a*-*n*, a detection client 332*a*-*n* can obtain information from the client devices 340*a*-*n* and/or the virtual conference provider 310. This information can be obtained via a network such as network 320.

In addition to authentication, the user identity provider 330 can perform malicious actor detection to identify untrustworthy conference participants (e.g., untrustworthy client devices). The malicious actor detection can be performed by a detection client 332a-n executing on a user identity provider 330, a client device 340a-n, and/or a detection client executing within the virtual conference provider 310. The detection client 332a-n, can include any combination of software and/or hardware needed to perform the malicious actor detection techniques described herein. The instructions or operations needed to perform the malicious actor detection techniques may be stored in a non-transitory computer readable medium within the user identity provider 330, the client devices 340a-n, and/or the virtual conference provider.

Machine learning models in the detection clients 332a-n can perform malicious actor detection to identify potentially untrustworthy client devices 340a-n. Each of the detection clients 332a-n can include the same features as those shown in detection client 332a. The security model 334 can be a machine learning model that is trained to output a probability that a client device is untrustworthy. For example, the data used to train the security model 334 can include commercially or publicly available datasets comprising information about computing devices that were used to conduct fraudulent activity. These datasets may not contain customer information and the security model 334, and any other model described herein, may not be trained on customer data. For example, the training data can include devices that committed credit card fraud and the training data may not be related to virtual conferences. After training, the weights for any model described herein may be frozen and the model may not continue to learn from customer behavior during the model's use.

During training, feature vectors representing the characteristics of computing devices can be generated. These feature vectors can be assigned a label based on whether the computing device engaged in fraudulent behavior (e.g., the device is untrustworthy; the device's identity was misrepresented). To train any model described herein, the model parameters are iteratively updated until the model can accurately classify the input feature vectors (e.g., an accuracy score for the model (F1 score) exceeds a threshold). The security model assigns a probability to each feature vector and a model is classified as untrustworthy if the probability assigned by the model exceeds a threshold.

A feature vector can be an ordered list of characteristics for a participant (e.g., a particular client device or user account). To generate a feature vector, a participant's characteristics can be converted to a numeric representation and included in the feature vector. For example, a yes/no question can be converted into a binary 0/1 value and/or a numeric code can be assigned for characteristics with more than one possible value. More complex information can be converted into feature vectors using a trained ML model. The participant information for an input vector to the security model can include any number of the following: a client device type, a client device operating system type, a client device operating system version, a client device virtual conference client software version, a client device connection type (e.g., what type of network is used by the client device; cellular, WiFi, etc.), an address for the client device (e.g., IPv4 address), whether the address for the client device is associated with a virtual private network (VPN), a geographic region for the address for the client device, a virtual conference provider account identifier (e.g., account number; email address) for the client device, a virtual conference provider account age, a virtual conference provider account language, a client device operating system language, a client software language, a number of mutual group conferences between a participant (e.g., a client device or virtual conference account) and each of the other conference participants (e.g., a number of previous conferences that were attended by participant and each of the other conference participants), a number of one on one meetings between the participant and each of the other conference participants, a number of messages between the participant and each of the other conference participants, a number of active chat days (e.g., calendar days when at least one message was sent) between the participant and each of the other conference participants, a message failure rate for each conference participant (e.g., a number of messages with no response sent by each conference participant), a number of virtual conference provider accounts that are associated with the client device (e.g., the number of accounts that have logged into the client device), a number of virtual conference provider accounts that are associated with the address for the client device, whether the conference participant is sharing a video stream, whether the conference participant is sharing an audio stream, and the like. In addition, the input vector can include historical values for each characteristic. In addition, the input vector can include information about the virtual conference such as information identifying a participant that created the conference, a conference language, or any other characteristic of the conference.

The output from an audio stream model 336 may be included in the input vector for the security model 334. The audio stream model 336 can be a model that is trained to output a probability that an input audio stream has been modified. If the probability exceeds a threshold, the audio stream can be classified as untrustworthy. The probability, or a binary classification, e.g., trustworthy or untrustworthy, provided by the audio stream model 336 can be included in the input to the security model 334.

The security model's input vector can include the output of a video stream model 338. For example, the video stream model 338 can be a model that is trained to output a probability that an input video stream has been modified. If the probability exceeds a threshold, the video stream can be classified as untrustworthy. The probability, or a binary classification, provided by the video stream model 338 can be included in the input to the security model 334.

The output from a natural language processing (NLP) model 342 may be included in the input vector for the security model 334. The NLP model 342 can be a model that is trained to output a probability that speech or text exchanged between conference participants represents potentially fraudulent behavior. The speech or text may be provided as input to the NLP model 342 which was trained on social engineering scripts to identify language that is similar to known social engineering schemes. If the probability exceeds a threshold, the conference participant generating the text or audio stream containing potentially fraudulent behavior (e.g., a social engineering scheme) can be flagged as untrustworthy. The probability, or a binary classification, provided by the NLP model 342 can be included in the input to the security model 334. In addition, the NLP model can use other natural language processing techniques to identify characteristics of the speech or text. For example, sentiment analysis may be used to identify language that is meant to scare the recipient, and a classification or probability that a participant is using fear inducing language can be included in the feature vector. In addition, the NLP model 342 may be able to calculate a probability that a participant has requested money or personally identifiable information, and this probability, or a classification derived from the probability, can be included in the input vector for the security model 334.

Figure 4:
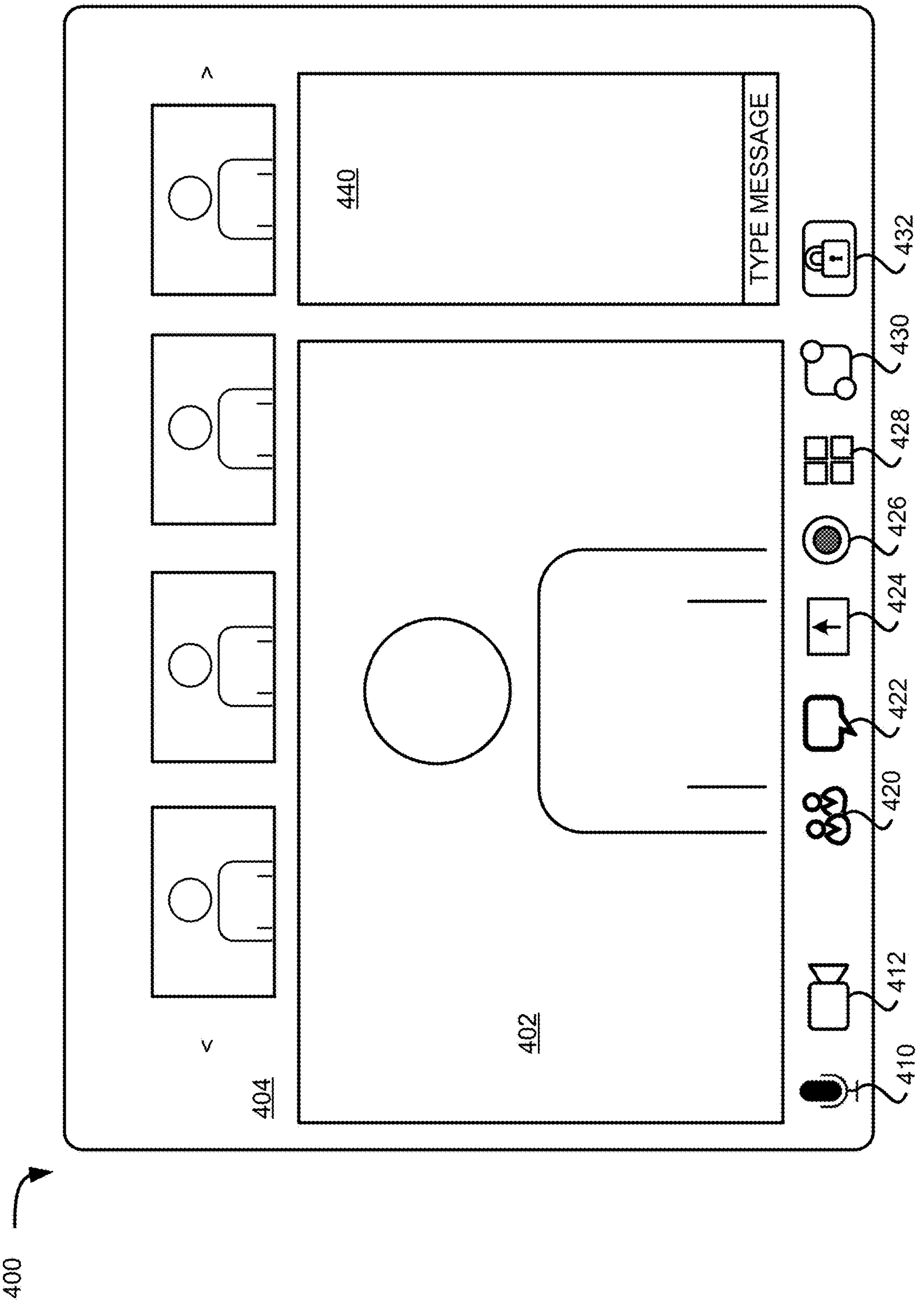
FIGS. 4-5 show example graphical user interfaces ("GUIs") for malicious actor detection for a virtual conference provider.

Referring now to FIGS. 4, FIG. 4 illustrates an example GUI 400 for a software client that can interact with a system for performing malicious actor detection. A client device, e.g., client devices 140-180, client devices 220-250, or client devices 330*a-n*, executes a software client as discussed above, which in turn displays the GUI 400 on the client device's display. In this example, the GUI 400 includes a speaker view window 402 that presents the current speaker in the virtual conference. Above the speaker view window 402 are smaller participant windows 404, which allow the participant to view some of the other participants in the virtual conference, as well as controls ("<" and ">") to let the host scroll to view other participants in the virtual conference. On the right side of the GUI 400 is a chat window 440 within which the participants may exchange chat messages. The chat messages exchanged during the conference can be grouped by the virtual conference provider to a meeting specific chat channel. If the virtual conference is a one-time meeting, the chat channel can contain chat messages exchanged by the meeting participants during the virtual conference. The chat channel for a meeting may be created when the conference is scheduled, and participants that are invited to the conference can be granted access to the meeting's channel. The participants can use the chat channel to exchange messages after the meeting has concluded. In some cases, a recurring meeting will have a single dedicated chat channel that is associated with every instance of the recurring meeting.

Beneath the speaker view window 402 are a number of interactive elements 410-530 to allow the participant to interact with the virtual conference software. Controls 410-512 may allow the participant to toggle on or off audio or video streams captured by a microphone or camera connected to the client device. Control 420 allows the participant to view any other participants in the virtual conference with the participant, while control 422 allows the participant to send text messages to other participants, whether to specific participants or to the entire meeting. Control 424 allows the participant to share content from their client device. Control 426 allows the participant to toggle recording of the meeting, and control 428 allows the user to select an option to join a breakout room. Control 430 allows a user to launch an app within the video conferencing software, such as to access content to share with other participants in the virtual conference. Control 432 allows a user, e.g., the host of the virtual conference, to toggle malicious actor detection techniques according to this disclosure.

Figure 5:
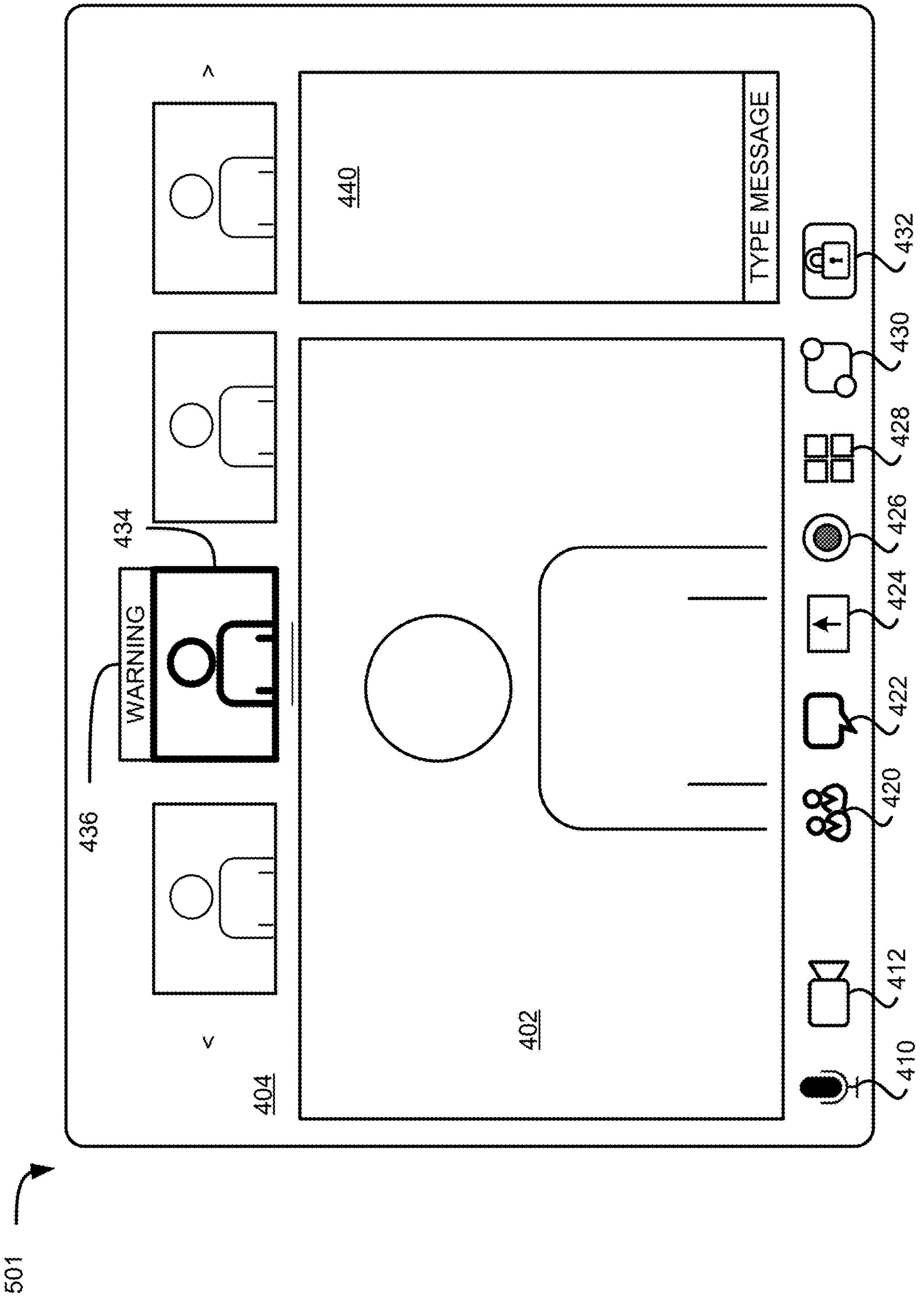

FIG. 5 shows an example GUI 501 for a software client that can interact with a system for performing malicious actor detection. Selecting control 532 in GUI 500 may cause a client device to display GUI 501. The description for features described with relation to GUI 500 can apply to similar features shown in GUI 501. After control 532 is selected, malicious actor detection can be performed on the conference participants to determine whether any participant is potentially untrustworthy. In this case, a conference participant 524 is determined to be untrustworthy based on this analysis. In some embodiments, the user can be visually identified as untrustworthy with graphic 536. Other corrective actions are contemplated such as automatically removing participant 535 from the virtual conference, muting participant 534, changing the position of participant 545 within the participant windows 504 (e.g., placing participant 534 in a prominent position so that they are identifiable), and/or changing the permissions of participant 534. The conference host or the participant controlling GUI 501 may be prompted to determine whether to perform a corrective action and to select a corrective action. In some embodiments, every conference participant may be notified of the potentially untrustworthy participant even if a notified conference participants did not ask for malicious actor detection. In some embodiments, malicious actor detection is automatically performed without user input (e.g., without anyone selecting control 532).

Figure 6:
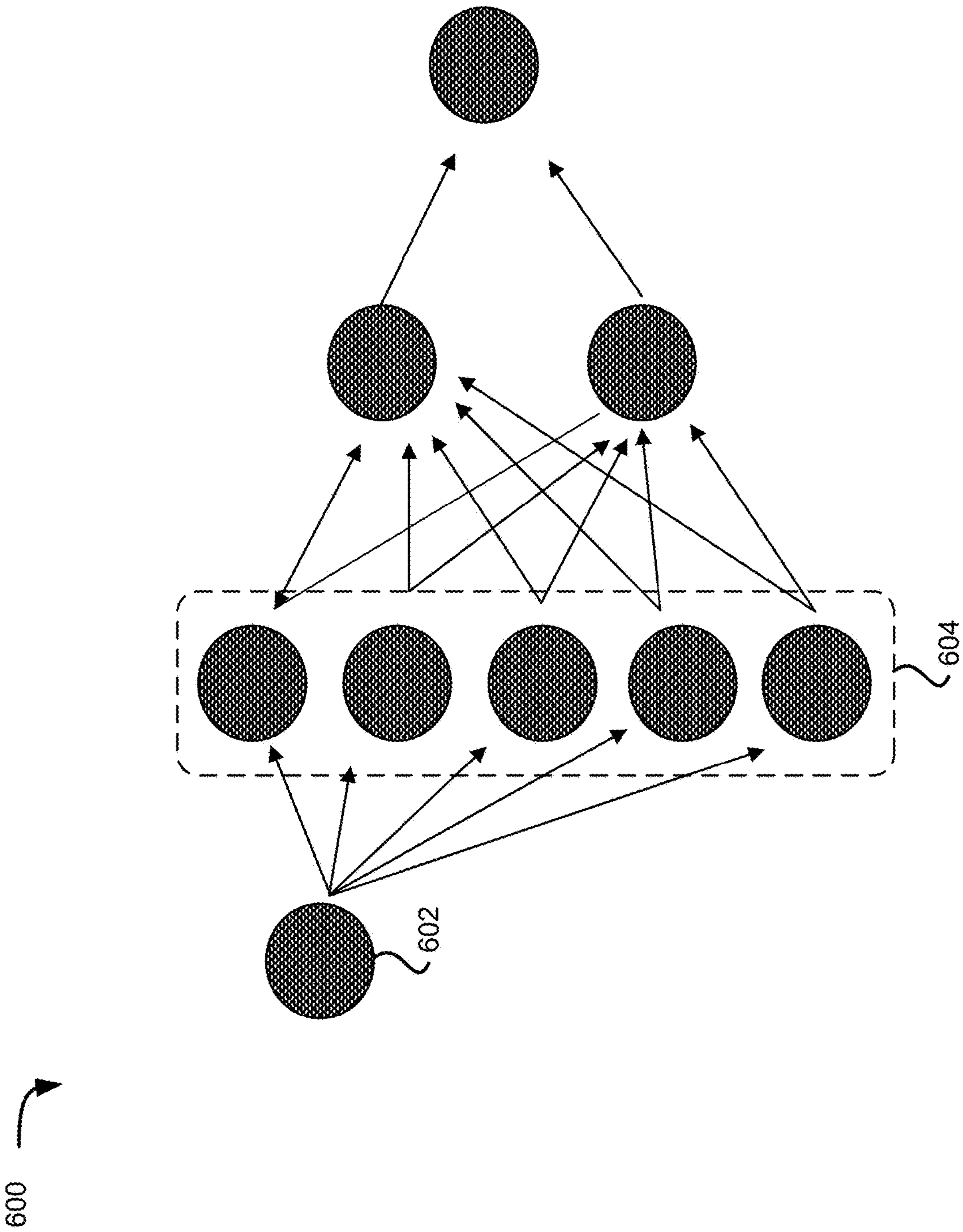
FIG. 6 shows an example machine learning (ML) model for malicious actor detection for a virtual conference provider.

FIG. 6 shows an example machine learning model of a neural network. As an example, the chat service can classify the probability that a conference participant is untrustworthy (e.g., the participant is concealing their identity) using a neural network that comprises a number of neurons (e.g., neuron 602; Adaptive basis functions) organized in layers (e.g., layer 604). The training of the neural network can iteratively search for the best configuration of the parameters of the neural network for feature recognition and classification performance. Various numbers of layers and nodes may be used. A person with skills in the art can easily recognize variations in a neural network design and design of other machine learning models.

After it is trained, the machine learning model can make use of participant information and virtual conference information to perform malicious actor detection as discussed above. The information may include information that is retrieved from the virtual conference provider. The participant information for a particular conference participant can include a last timestamp for a meeting between the particular participant and each participant in the conference, the number of one-on-one meetings between the particular participant and each participant in the conference, the number of shared group meetings between the particular participant and each participant in the conference, the number of active chat days between the particular participant and each participant in the conference (e.g., consecutive days where a message has been sent, in either direction, between each participant in the conference), the number of direct chat channel messages between the particular participant and each participant in the conference, whether each participant in the conference is in the particular participant's favorites list, whether a chat channel that includes the particular participant and another conference participants is in the particular participant's favorites list, whether particular participant and any of the conference participants have common access to a shared folder in the virtual conference provider's system, the number of shared user groups that include the particular participant and another conference participants relationship information from an organizational chart (e.g., is the particular participant in an any of the other participants' organization), a number of voice calls made between the particular participant and another conference participant that were made through the virtual conference provider or by a client device, a number of missed calls between the particular participant and any of the other conference participants, a number of text messages sent between the particular participant and any of the other conference participants using a client device (e.g., smartphone), etc.

Figure 7:
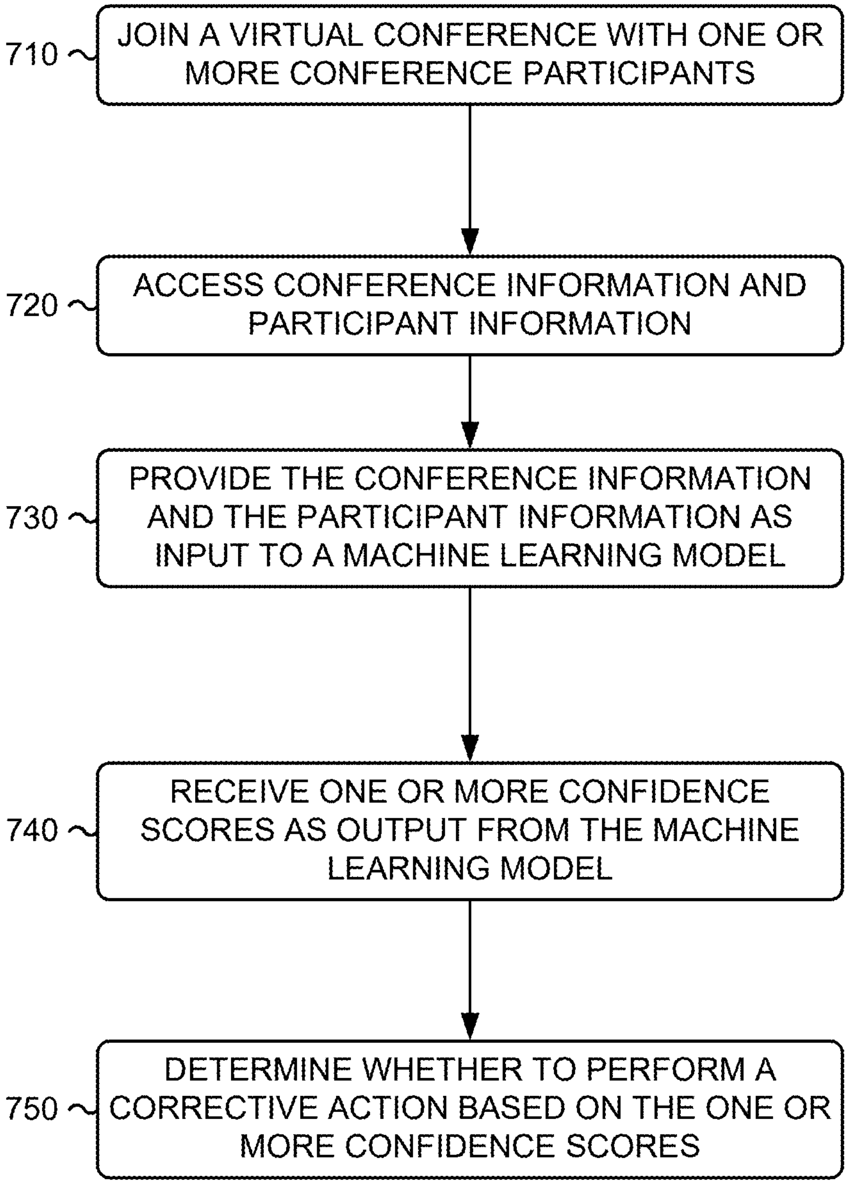
FIG. 7 shows an example method for malicious actor detection for a virtual conference provider.

Referring now to FIG. 7, FIG. 7 shows an example method 700 for malicious actor detection for a virtual conference. This example method 700 will be described with respect to the systems 100-400 shown in FIGS. 1-4, the example GUIs 400-401 shown in FIGS. 4-5, the example machine learning model 600 shown in FIG. 6, and the computing device 800 shown in FIG. 8; however, any suitable devices, systems, or GUIs according to this disclosure may be employed.

At block 710, a virtual conference with one or more conference participants can be joined. The virtual conference may be hosted by a virtual conference provider. In some embodiments, joining a conference may be a request to join the conference and blocks 720-750 may be performed before the virtual conference is joined by the computing device. In some implementations, malicious actor detection can be performed for the participants of a telephone call, a chat channel, emails, or hybrid conferences (e.g., events with a live audience and virtual conference participants).

At block 720, conference information and participant information can be accessed. The conference information can correspond to the virtual conference from block 710, and the participant information can correspond to each of the one or more client devices for the one or more conference participants. In some embodiments, a client device can be a device that is providing a video stream to the conference from 710, providing an audio stream to the conference, receiving a video stream from the conference, and/or receiving an audio stream from the conference. In some embodiments, a conference participant can have an account that is used to created the virtual conference (e.g., by requesting a virtual conference from the virtual conference provider). In some embodiments, the account for the virtual conference participants can include any account or email address that received an invitation to attend the virtual conference (e.g., received an email invitation to the conference from the provider).

The participant information can include information corresponding to a participant in the virtual conference. For example, the participant information can include a participant identifier, a participant email address, a client device operating system, a client device address, a client device type, a client software version, a video stream score, and/or an audio stream score.

In some embodiments, accessing the participant information can comprise providing an audio stream corresponding to each of the one or more client devices for the one or more conference participants as input to one or more machine learning models. In some embodiments, audio streams corresponding to a subset of the one or more client devices may be provided as input to the model. An audio stream score corresponding to each of the one or more client devices, or a subset of the client devices, can be received as output from the machine learning model.

In some embodiments, accessing the participant information can comprise providing a video stream corresponding to each of the one or more client devices for the one or more conference participants as input to a machine learning model. In some embodiments, video streams corresponding to a subset of the one or more client devices may be provided as input to the model. A video stream score corresponding to each of the one or more client devices, or a subset of the client devices, can be received as output from the machine learning model.

In some embodiments, a user can provide a list of approved devices or addresses for the account. These approved devices or addresses can be included in the participant information. The account can be an account for an organization or a company, and the account can be an administrative account that has administrative permissions (e.g., permission to modify or update the settings for other accounts). The user can identify devices though a media access control (MAC) address associated with the devices, an internet protocol (IP) address or any other address that can identify a device. In some embodiments, the user can provide a list of disapproved devices that can be used to flag devices or addresses that are suspected as security threats. The disapproved devices can be used as part of the participant information.

At block 730, the conference information and the participant information can be provided as input to a machine learning model. The machine learning model can be trained to assign a confidence score to each of the one or more client devices for the one or more conference participants, as discussed above. For example, the confidence score can be a probability that the conference participant or client device is potentially fraudulent. In some embodiments, the machine learning model can be multiple machine learning models.

The conference information and the participant information may be transformed into a feature vector before the information is input to a machine learning model. A feature vector is an ordered list of numerical characteristics and generating a feature vector may involve converting characteristics of the conference information and/or participant information into numerical values. For example, one of the characteristics can be a geographic region corresponding to a participant and this can be converted to a numeric value by assigning a numeric code to each possible geographic region. In some examples, feature vectors may encode more complex information about a participant and may be generated by a suitable ML model.

In some embodiments, the feature vector may include numeric outputs from machine learning models. For example, a participant's video feed may be provided to a model that is trained to provide a confidence score indicating a probability that a video feed has been altered (e.g., a filter has been used to change a person's appearance in the feed). This confidence score, and/or a confidence score for the audio feed generated by a separate model, can be included in the feature vector.

At block 740, one or more confidence scores can be received as output from the machine learning model. For example, each confidence score can correspond to a conference participant. In some embodiments, a confidence score may be assigned to the virtual conference by the machine learning model.

At block 750, whether to perform a corrective action on a respective conference participant based on a respective confidence score of the one or more confidence scores. A respective confidence score can be a confidence score that was generated for the respective conference participant. Whether to perform a corrective action can be determined for each of the one or more conference participants.

Corrective actions can include assigning a warning flag to the respective conference participant. This warning flag may be on the backend of the virtual conference provider system and may not be displayed to the conference participants or the flag may be visually indicated in the virtual conference provider's GUI (e.g., a red box around the video feed corresponding to the participant). In some embodiments, the corrective action may include removing the respective participant from the conference. In addition or alternatively, the corrective action may require the respective conference participant to provide additional verification information. This additional verification information can include an account password, an identification document, answers to verification questions (e.g., first dog's name), and/or a spoken passphrase. In some embodiments, the corrective actions may include changing the permissions for the respective conference participant and the participant may be prevented from recording the conference and/or accessing the chatlog. In some embodiments, the corrective actions can include suggested changes to settings (e.g., a suggestion to enable two factor authentication), or suggested software updates (e.g., suggested changes in software from a current software version to a particular software version). In some embodiments, the corrective actions may include providing instructional information such as documentation describing best security practices, known security threats, or regional security requirements (e.g., information about known threats in a participant's current location).

Whether to perform a corrective action can be determined by comparing a confidence score to one or more thresholds. The threshold can be a confidence score and a corrective action may be taken if the confidence score for the respective conference participant is below the threshold. For example, the confidence score can be a probability between 0 and 1, and the threshold can be 0.90. So, a corrective action may be taken if the confidence score is below 0.90. In some embodiments, different corrective actions can be based on different thresholds. For example, the respective conference participant can be flagged in the GUI and the participant may be flagged for additional verification information if the confidence score is below 0.90, but the respective participant may be removed from the conference immediately if the confidence score is below 0.60.

In some embodiments, the threshold for a particular conference participant can be based on that participant's past confidence scores. For example, the threshold can be an average of the respective conference participant's confidence scores over a time period (e.g., over the last 30 days) or over a number of conferences (e.g., the last 5 conferences). In some embodiments, the threshold for the respective conference participant can be a difference from an average conference score for the conference. For example, the average confidence score for the conference can be 0.82 and a corrective action may be performed if the respective conference participant is a threshold difference from the average confidence score. The threshold difference can be a fixed probability (e.g., 0.20 score difference) or a calculated difference (e.g., 1.5 standard deviations from the average conference score).

Figure 8:
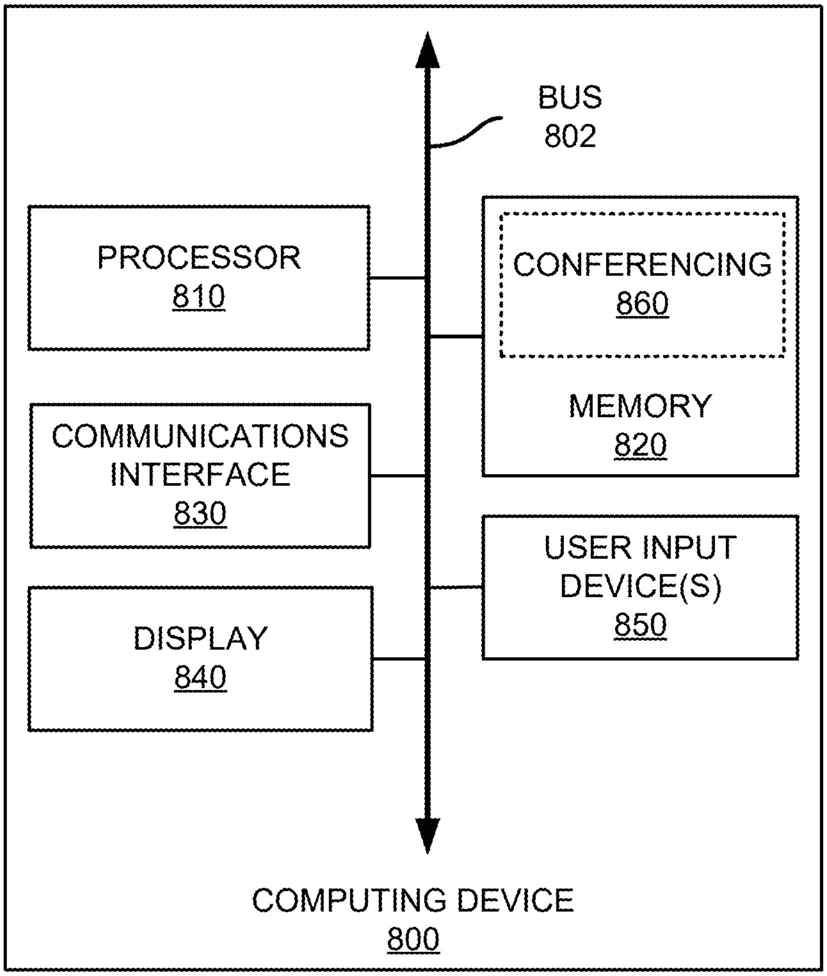
FIG. 8 shows an example computing device suitable for use with example systems and methods for malicious actor detection for a virtual conference provider.

Referring now to FIG. 8, FIG. 8 shows an example computing device 800 suitable for use in example systems or methods for malicious actor detection for a virtual conference according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for malicious actor detection for a virtual conference according to different examples, such as part or all of the example method 700 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a video conferencing application 860 to enable a user to join and participate in one or more virtual spaces or in one or more conferences, such as a conventional conference or webinar, by receiving media streams from a virtual conference provider, sending media streams to the virtual conference provider, joining and leaving breakout rooms, creating virtual conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:

joining, by a computing device, a virtual conference with one or more conference participants, wherein the virtual conference is hosted by a virtual conference provider;

accessing, by the computing device, conference information corresponding to the virtual conference and participant information corresponding to each of the one or more conference participants;

providing, by the computing device, the conference information and the participant information as input to a first machine learning model, wherein the first machine learning model is trained to assign a confidence score to each of the one or more conference participants;

receiving, by the computing device, one or more confidence scores as output from the first machine learning model, wherein each confidence score corresponds to a conference participant; and determining, by the computing device and for at least one of the one or more conference participants, whether to perform a corrective action on a respective conference participant based on a respective confidence score of the one or more confidence scores.

2. The method of claim 1, wherein accessing the participant information comprises:

providing, by the computing device, an audio stream corresponding to each of the one or more conference participants as input to a second machine learning model; and receiving, by the computing device, an audio stream score corresponding to each of the one or more conference participants as output from the second machine learning model.

3. The method of claim 1, wherein accessing the participant information comprises:

providing, by the computing device, a video stream corresponding to each of the one or more conference participants as input to a second machine learning model; and receiving, by the computing device, a video stream score corresponding to each of the one or more conference participants as output from the second machine learning model.

4. The method of claim 1, wherein the participant information comprises one or more of: a participant identifier, a participant email address, a client device operating system, a client device address, a client device type, a client software version, a video stream score, and an audio stream score.

5. The method of claim 1, wherein the corrective action comprises:

flagging, by the computing device, the respective conference participant as untrustworthy in a graphical user interface.

6. The method of claim 1, wherein the corrective action comprises:

instructing, by the computing device, the virtual conference provider to remove the respective conference participant from the virtual conference.

7. The method of claim 1 wherein determining whether to perform the corrective action comprises:

comparing, by the computing device, each of the one or more confidence scores to a respective confidence threshold.

8. The method of claim 7, wherein the respective confidence threshold is a past confidence score, wherein the past confidence score was generated during a past virtual conference.

9. A computing device, comprising:

one or more memories; and one or more processors in communication with the one or more memories and configured to execute instructions stored in the one or more memories to perform operations comprising:

joining, by the computing device, a virtual conference with one or more conference participants, wherein the virtual conference is hosted by a virtual conference provider;

accessing, by the computing device, conference information corresponding to the virtual conference and participant information corresponding to each of the one or more conference participants;

providing, by the computing device, the conference information and the participant information as input to a first machine learning model, wherein the first machine learning model is trained to assign a confidence score to each of the one or more conference participants;

receiving, by the computing device, one or more confidence scores as output from the first machine learning model, wherein each confidence score corresponds to a conference participant; and determining, by the computing device and for at least one of the one or more conference participants, whether to perform a corrective action on a respective conference participant based on a respective confidence score of the one or more confidence scores.

10. The computing device of claim 9, wherein accessing the participant information comprises:

providing, by the computing device, an audio stream corresponding to each of the one or more conference participants as input to a second machine learning model; and receiving, by the computing device, an audio stream score corresponding to each of the one or more conference participants as output from the second machine learning model.

11. The computing device of claim 9, wherein accessing the participant information comprises:

providing, by the computing device, a video stream corresponding to each of the one or more conference participants as input to a second machine learning model; and receiving, by the computing device, a video stream score corresponding to each of the one or more conference participants as output from the second machine learning model.

12. The computing device of claim 9, wherein the participant information comprises one or more of: a participant identifier, a participant email address, a client device operating system, a client device address, a client device type, a client software version, a video stream score, and an audio stream score.

13. The computing device of claim 9, wherein the corrective action comprises:

flagging, by the computing device, the respective conference participant as untrustworthy in a graphical user interface.

14. The computing device of claim 9, wherein the corrective action comprises:

instructing, by the computing device, the virtual conference provider to remove the respective conference participant from the virtual conference.

15. A non-transitory computer-readable medium storing a plurality of instructions that, when executed by one or more processors of a computing device, cause the one or more processors to perform operations comprising:

joining, by the computing device, a virtual conference with one or more conference participants, wherein the virtual conference is hosted by a virtual conference provider;

accessing, by the computing device, conference information corresponding to the virtual conference and participant information corresponding to each of the one or more conference participants;

providing, by the computing device, the conference information and the participant information as input to a first machine learning model, wherein the first machine learning model is trained to assign a confidence score to each of the one or more conference participants;

receiving, by the computing device, one or more confidence scores as output from the first machine learning model, wherein each confidence score corresponds to a conference participant; and determining, by the computing device and for at least one of the one or more conference participants, whether to perform a corrective action on a respective conference participant based on a respective confidence score of the one or more confidence scores.

16. The non-transitory computer-readable medium of claim 15, wherein accessing the participant information comprises:

providing, by the computing device, an audio stream corresponding to each of the one or more conference participants as input to a second machine learning model; and receiving, by the computing device, an audio stream score corresponding to each of the one or more conference participants as output from the second machine learning model.

17. The non-transitory computer-readable medium of claim 15, wherein accessing the participant information comprises:

providing, by the computing device, a video stream corresponding to each of the one or more conference participants as input to a second machine learning model; and receiving, by the computing device, a video stream score corresponding to each of the one or more conference participants as output from the second machine learning model.

18. The non-transitory computer-readable medium of claim 15, wherein the participant information comprises one or more of: a participant identifier, a participant email address, a client device operating system, a client device address, a client device type, a client software version, a video stream score, and an audio stream score.

19. The non-transitory computer-readable medium of claim 15, wherein the corrective action comprises:

flagging, by the computing device, the respective conference participant as untrustworthy in a graphical user interface.

20. The non-transitory computer-readable medium of claim 15, wherein the corrective action comprises:

instructing, by the computing device, the virtual conference provider to remove the respective conference participant from the virtual conference.

* * * * *